United States Patent [19]

Tokumitsu

[11] Patent Number: 4,796,221

[45] Date of Patent: Jan. 3, 1989

[54] MEMORY CONTROL DEVICE

[75] Inventor: Shigenori Tokumitsu, Fukaya, Japan

[73] Assignee: Kabushiki Kaisha Toshiba, Kanagawa, Japan

[21] Appl. No.: 844,624

[22] Filed: Mar. 27, 1986

[30] Foreign Application Priority Data

Mar. 28, 1985 [JP] Japan .............................. 60-61863

[51] Int. Cl.[4] ........................ G06F 13/40; G06F 3/00

[52] U.S. Cl. ................................ 364/900; 364/200

[58] Field of Search ... 364/200 MS File, 900 MS File

[56] References Cited

U.S. PATENT DOCUMENTS

| | | | |
|---|---|---|---|
| Re. 31,200 | 4/1983 | Sukonick et al. | 340/724 |
| 4,144,562 | 3/1979 | Cooper | 364/200 |
| 4,417,318 | 11/1983 | Hirahata et al. | 364/900 |
| 4,462,073 | 7/1984 | Grondalski | 364/200 |
| 4,511,962 | 4/1985 | Machida et al. | 364/200 |
| 4,545,068 | 10/1985 | Tabata et al. | 382/41 |
| 4,580,242 | 4/1986 | Suzuki et al. | 364/900 |
| 4,595,996 | 6/1986 | Morley et al. | 364/900 |
| 4,663,732 | 5/1987 | Robinson | 364/900 |

OTHER PUBLICATIONS

Intel "The 8086 Family User's Manual,", pp. A--3-A-184 Oct. 1979.

*Primary Examiner*—Gareth D. Shaw
*Assistant Examiner*—Christina M. Eakman
*Attorney, Agent, or Firm*—Finnegan, Henderson, Farabow, Garrett, & Dunner

[57] ABSTRACT

A memory control device which is able to interface with any memory regardless of the address information format for reading out data stored therein. The memory control device includes an address generator for generating address information for reading out corresponding data from the memory device, a data processing circuit such as a microprocessor for processing the stored data, a first bus for transmitting the stored data from the memory device to the data processing circuit, a second bus for transmitting address information generated by the address generator to the memory device, a third bus for selectively transmitting either the stored data to the data processing circuit or transmitting address data to the memory device, a mode signal generator for generating a mode signal, and a control circuit connected between the mode signal generator and the third bus for controlling the selective data transmission of the third bus in response to the mode signal.

4 Claims, 6 Drawing Sheets

MEMORY CONTROL DEVICE

BACKGROUND OF THE INVENTION

1. Field of the Invention

The present invention relates to a memory control device, and more particularly to a memory control device which is able to interface with a memory device regardless of the address information format for reading out data stored therein.

2. Description of the Prior Art

There is a conventional system for displaying image data stored in a memory device as a static image such as a letter on a display device of a raster scan system of a cathode ray tube (CRT), for example, a teletext sytem and a videotex system. In these systems, it is necessary to control the generation of horizontal and vertical synchronizing signals and of address information for the memory for reading out the image data to be displayed on an image screen of the CRT from the memory in synchronization with the electron beam position of the CRT and for displaying it. A memory control device is used for performing the above operation.

Either a dynamic RAM (D-RAM) or a static RAM (S-RAM) is generally used in the memory device described above. The D-RAM is less expensive and has a large memory capacity, but the access time is slow. Further the D-RAM has the disadvantage that it requires a large number of other components for operating it as a parallel unit because the D-RAM usually has a one bit structure. On the other hand, the S-RAM has a fast access time. But it is more expensive, small in memory capacity and large in power dissipation. However, the S-RAM usually has an advantage in that it requires fewer components when used as a parallel unit because the S-RAM has a parallel bit structure, e.g., 8-bit parallel.

As described above, both the S-RAM and the D-RAM have respective merits and demerits for use in a memory device. A choice between the D-RAM and the S-RAM is made in accordance with the needs of each system. Therefore, the memory control device which can interface with either type of RAM has good utility and wide application.

Interfaces for address information are different between the D-RAM and the S-RAM. The D-RAMs have a large memory capacity as described above so that they are apt to have a large number of connection pins in accordance with the number of address lines. Therefore, in a conventional D-RAM, the memory is divided in two or more sections and fewer address lines are used in common by the divided memory sections for a time-shared operation system to decrease the number of connection pins.

For example, taking a memory device of 64K words (K designates $2^{10}$ bits and one word consists of 16-bits), the address information requires 16-bits. In the D-RAM, a 16-bit address is divided into two units of 8-bits and these 8-bit units are inputted in a time-shared operation as a row address and a column address respectively. In the S-RAM, on the other hand, a 16-bit address consisting of the row address and the column address is inputted by one unit.

As described above, a conventional memory control device has the disadvantage that it must be modified for the particular memory device in accordance with the difference in address information format.

SUMMARY OF THE INVENTION

An object of the present invention is to provide a memory control device with wide general application to any memory device regardless of address information format such as used with the D-RAM or the S-RAM.

This and other objects are achieved in the memory control device of the present invention for reading data from a memory device where the data is stored with prescribed address information. This memory control device includes:

1. an address generator for generating address information for reading out corresponding data from the memory device, 2. a data processing circuit such as a microprocessor for processing the stored data, 3. a first bus for transmitting the stored data from the memory device to the data processing circuit, 4. a second bus for transmitting address information generated by the address generator to the memory device, 5. a third bus for selectively transmitting the stored data to the data processing circuit the same as with the first bus or transmitting address data to the memory device the same as with the second bus, 6. a mode signal generator for generating a mode signal, and 7. a control circuit connected to the mode signal generator and the third bus for controlling the selective data transmission of the third bus in response to the mode signal.

Additional objects, advantages, and features of the present invention will further become apparent to persons skilled in the art from a study of the following description and of the accompanying drawings, in which:

DESCRIPTION OF THE PREFERRED EMBODIMENTS

Figure 1:
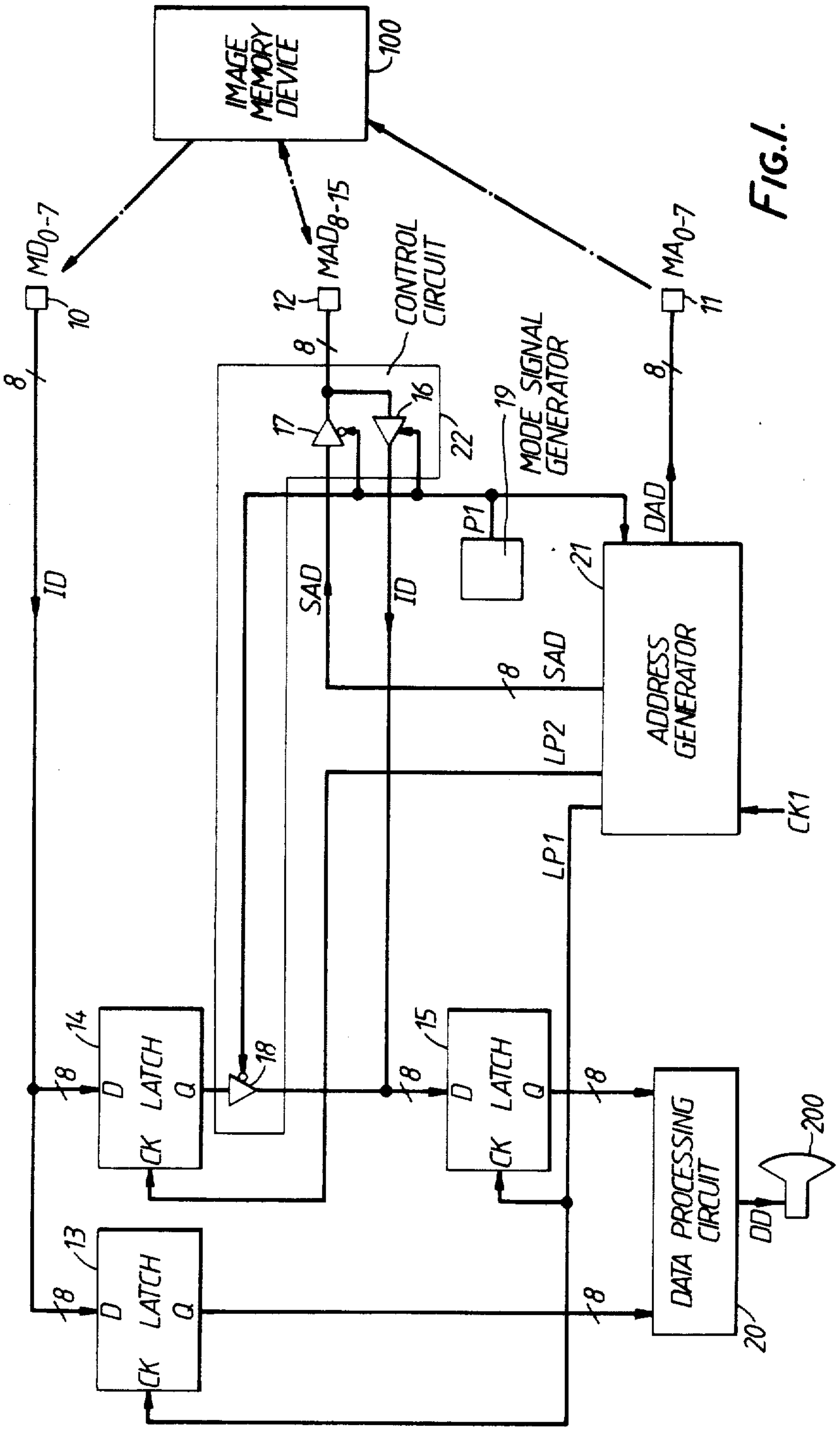
FIG. 1 is a circuit diagram showing an image memory control device, which is the first preferred embodiment according to the present invention.

The present invention will now be described in detail with reference to the accompanying drawings, namely, FIGS. 1 to 6. Throughout the drawings, like reference numerals and letters are used to designate like or equivalent elements for the sake of simplicity of explanation.

Referring now to FIG. 1, there is shown a circuit block diagram of an image memory control device, which is the first preferred embodiment according to the present invention together with an image memory device 100 and a display unit shown as CRT 200. The image memory device used generally has a bit structure of some multiple of 8-bits. In this embodiment, an 8-bit structure is used when an S-RAM is used as the image memory device, while a 16-bit structure is used when a D-RAM is used. Because the access time for the D-RAM is slower than that for the S-RAM, in the case of the D-RAM, the address information is applied 8-bits at a time to memory device 100 by the time-shared type operation described previously.

It is assumed that image memory device 100 has an address space of 64K with address information represented by 16 bits. Therefore, image memory device 100 can be a $16\times64$K bit array when image memory device 100 is a D-RAM while it can be a $8\times64$K bit array when it is a S-RAM.

The screen of CRT 200 is arranged for displaying blocks in 256 columns by 256 rows. Each block consists of a 4 dot column by a 4 dot row pattern. When each block is respectively assigned 4 bits of foreground color FG, background color BG and data attribute DA as coloring information to the blocks, a $16\times64$K bit D-RAM has a capacity of 8 screens, while an $8\times64$K bits S-RAM has the capacity of 4 screens.

In FIG. 1, image memory device 100 is coupled to terminals 10 to 12 of the image memory control device through its connection pins. Terminal 10 is connected from a first bus MD connected for transmitting image data stored in image memory device 100 to input terminals of a data processing circuit 20. First bus MD is divided into a first and second branch. The first branch is connected to data processing circuit 20 through a first latch 13 and the second branch is connected to data processing circuit 20 through a second latch 14, a 3-state buffer 18 and a third latch 15.

Terminal 11 is connected from a second bus MA to an address generator 21, which will be described in detail later in reference to FIG. 2, for transmitting address information DAD to image memory device 100.

Terminal 12 from a third bus MAD is connected to both data processing circuit 20 and address generator 21 through a control circuit 22 comprised of first, second and third 3-state buffers 16, 17 and 18. Third bus MAD is also divided into two branches in control circuit 22. One branch is connected from buffer 16 to a node between 3-state buffer 18 and latch 15. The other branch is connected to address generator 21 through 3-state buffer 17 of control circuit 22. Then 3-state buffers 16 and 17 in control circuit 22 are complementarily activated so that they selectively connect third bus MAD to data processing circuit 20 for supplying it with the image data stored in image memory device 100 or connect third bus MAD to the image memory device 100 for receiving address information SAD from the address generator 21.

First and third latches 13, 15 are connected at their clock terminals CKs to a first clock output terminal of address generator 21 for receiving a first latch pulse LP1, while second latch 14 is connected at its clock terminal CK to a second clock output terminal of address generator 21 for receiving a second latch pulse LP2. The image data supplied from image memory device 100 to the respective latches is held in accordance with latch pulse LP1 or LP2. Three-state buffers 16, 17 and 18 are connected at their respective control terminals to a mode signal generator 19 for receiving a mode signal P1. The control signal for buffers 17 and 18 are inverted while the control signal to buffer 16 is not inverted. Mode signal generator 19, which typically is a simple 1-bit register, is also connected to address generator 21. Depending on whether a D-RAM or an S-RAM is used, the 1-bit register will be constructed to output "0", i.e., a zero in the logic value or "1", i.e., a one in the logic value.

It is assumed that terminals 10 to 12, latches 13 to 15 and 3-state buffers 16 to 18 in FIG. 1 respectively represent 8 units of each component. Also it is assumed that buses MD, MA and MAD are actually comprised of 8 lines as indicated by the numeral "8" attached by slant lines on the buses.

Three-state buffers 16, 17 and 18 operate in active or high impedance states in accordance with mode signal P1. Mode signal P1 is set in accordance with whether the D-RAM is used as the image memory device 100 or the S-RAM is used. In this embodiment, mode signal P1 is set to "1" when the D-RAM is used and to "0" when the S-RAM is used. Data processing circuit 20 decodes the image data read out from image memory device 100 for each 16-bits and produces display data corresponding to the image data for display on CRT 200. Address generator 21 produces latch pulses LP1, LP2 and address information DAD only when a D-RAM is used. Address generator 21 produces both address information DAD and SAD when an S-RAM is used.

Figure 2:
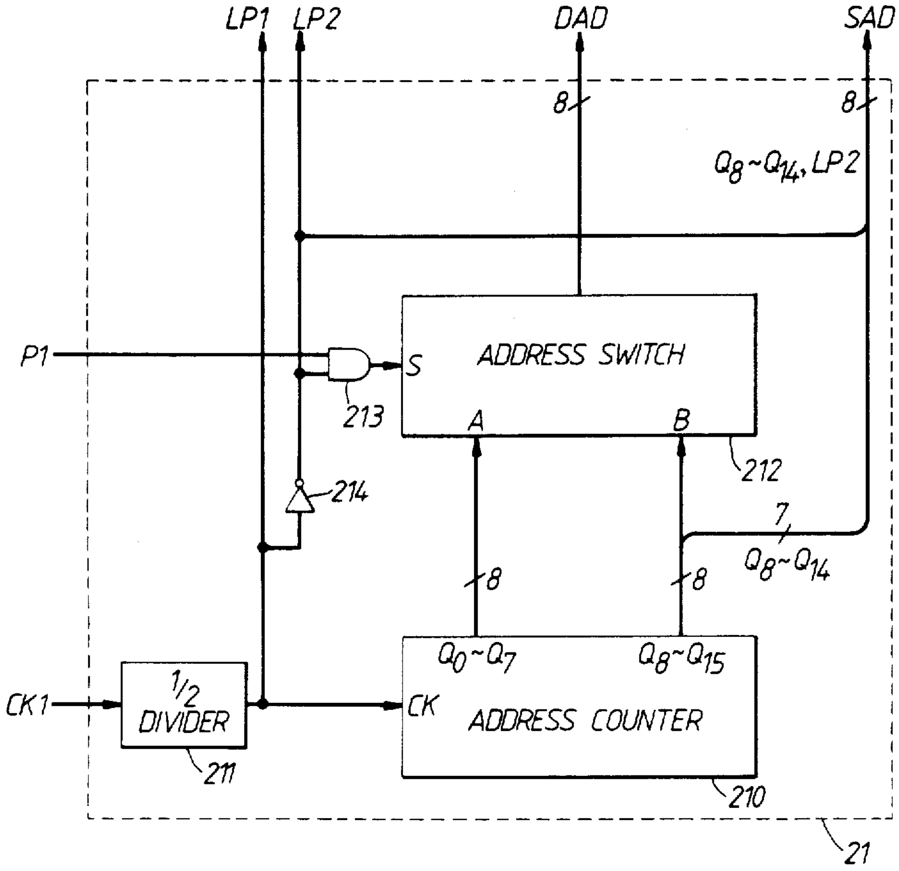
FIG. 2 is a circuit block diagram showing the detail of the address generator of the embodiment shown in FIG. 1.

Referring now to FIG. 2, address generator 21 in FIG. 1 will be described in detail. In address generator 21, an address counter 210 carries out its counting operation for latch pulse LP1 applied at clock input terminal CK and generates a 16-bit output on its output terminals Q0–Q15. Address counter 210 is connected to an address switch 212 to supply the 16 bit address information Q0–Q15. The lower 8-bits Q0–Q7 and the upper 8-bits Q8–Q15 of the outputs are independently inputted through two input terminals A and B respectively. Address switch 212 selects the lower 8-bits Q0–Q7 or upper 8-bits Q8–Q15 and outputs the selected outputs Q0–Q7 or Q8–Q15 as aforementioned address information DAD in accordance with a select control signal applied to select terminal S. The 9th to 15th bits Q8–Q14 of outputs of address counter 210 are divided from the upper 8-bit outputs and combined with latch pulse LP2. The combined signal is outputted as address information SAD from address generator 21. In address information SAD, latch pulse LP2 constitutes an MSB of 8-bits. Address generator 21 also has a ½ divider 211, an AND gate 213 and an inverter 214. ½ divider 211 divides the frequency of a master clock signal CK1 and outputs the divided output from address generator 21 as latch pulse LP1 and also applies the divided output to clock terminal CK of address counter 210. The output of ½ divider 211 is also applied to inverter 214. The output of inverter 214 is outputted from address generator 21 as latch pulse LP2 and also applied to one input terminal of AND gate 213. Latch pulse LP2 from inverter 214 is also combined in address information SAD as its MSB bit as described above. Mode signal P1 is applied to the other input terminal of AND gate 213. Then, latch pulse LP2 is able to pass through AND gate 213 to select terminal S of address switch 212 when mode signal P1 is "1". But it is prevented from passing when mode signal P1 is "0".

Figure 3:
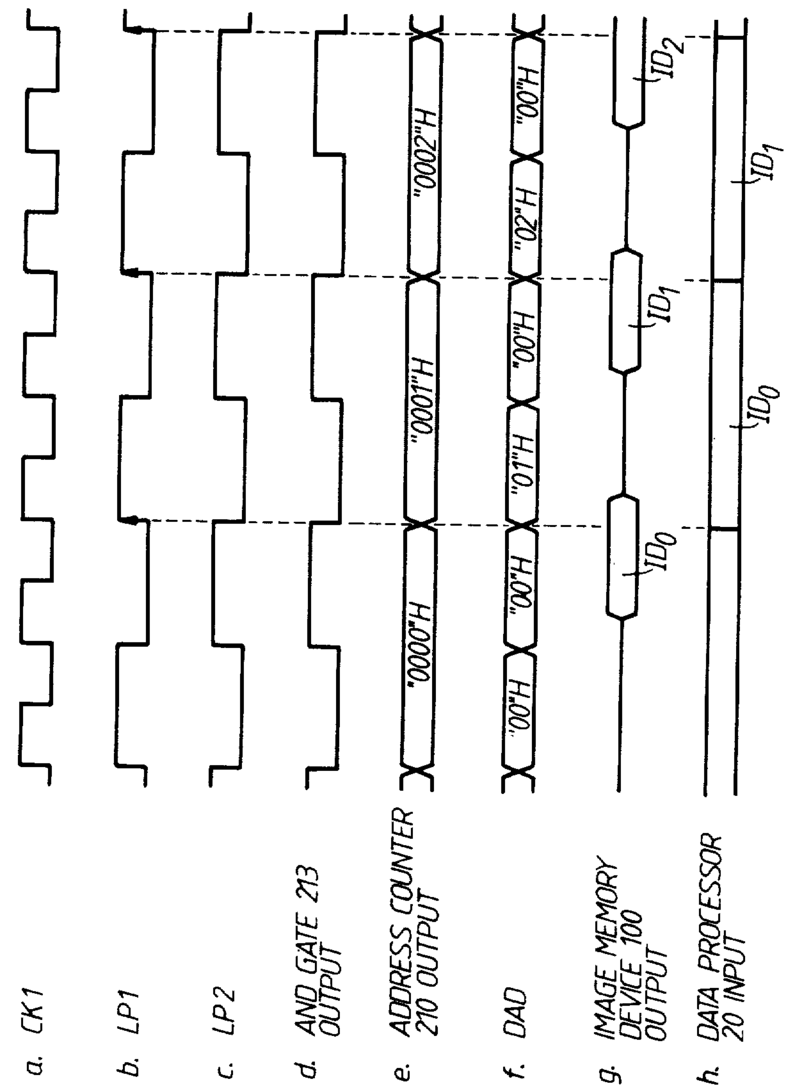
FIGS. 3 and 4 are timing charts for explaining the operation of the embodiment of FIGS. 1 and 2.
Figure 4:
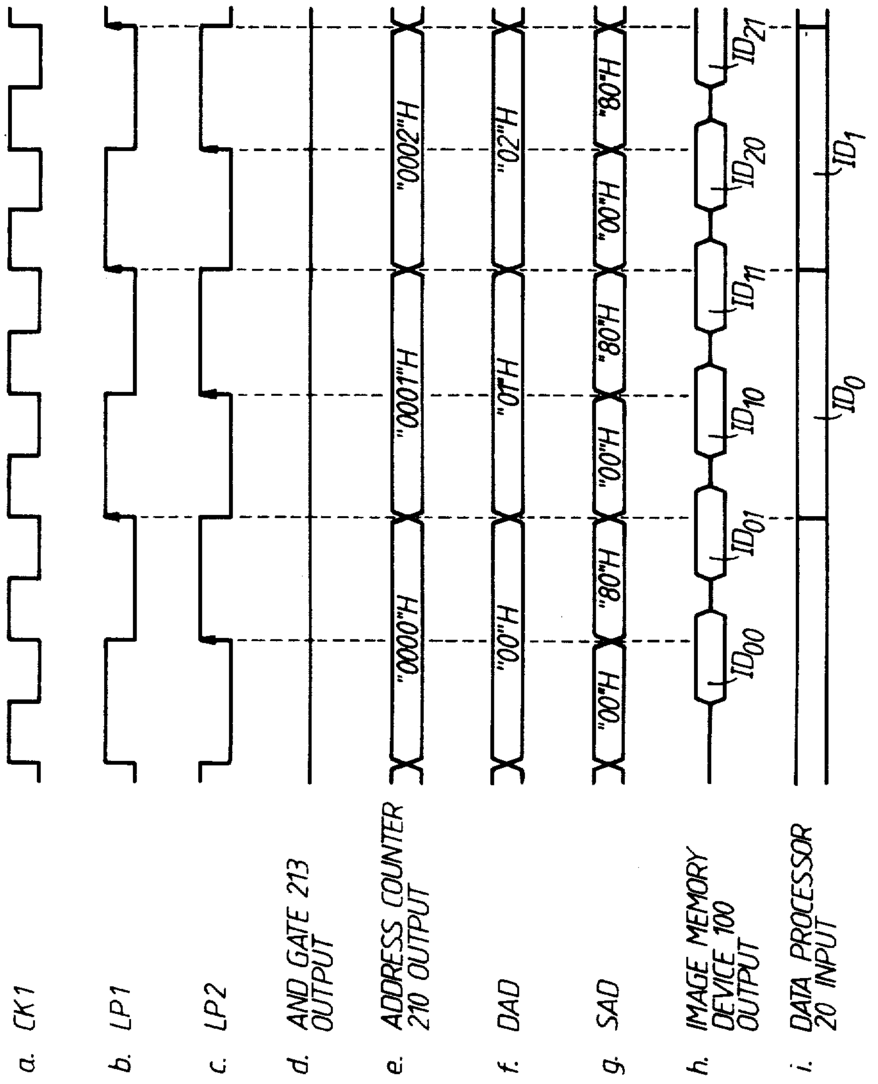

Referring now to FIGS. 3 and 4 which are the timing charts of the various signals, the operation of the embodiment shown in FIGS. 1 and 2 will be described in detail.

First, FIG. 3 shows a timing chart using a D-RAM as image memory device 100. In this case, as described above, the address information for D-RAM image memory device 100 is given as a row address and a column address using an 8-bit format and reading out the image data is performed every 16-bits. Also, a "1" is stored as mode signal P1 in mode signal generator 19 in accordance with the usage of the D-RAM, as described previously.

Latch pulse LP2 (FIG. 3-c) passes through AND gate 213 and is applied to select terminal S of address switch 212 as an output of AND gate 213 (FIG. 3-d), since the other input terminal of AND gate 213 (see FIG. 2) is the constant mode signal P1 which is set as the "1". The output (FIG. 3-d) of AND gate 213 therefore is the same as latch pulse LP2. Address switch 212 selects alternately lower 8-bit outputs Q0–Q7 and upper 8-bit outputs Q8–Q15 of the 16-bit outputs Q0–Q15, "0000"H, "0001"H, "0002H", etc. (suffix H designates the bit data in "" being hexadecimal) of address counter 210 (FIG. 3-e) in accordance with the value "1" or "0" of latch pulse LP2. Then, address switch 212 outputs alternately the lower 8-bit outputs Q0–Q7, "00"H, "01"H, "02"H, etc. and upper 8-bit outputs Q8–Q15, "00"H, "00"H, "00"H, etc. as address information DAD (FIG. 3-f). The address values in FIG. 3 are expressed using hexadecimal digits. Address information DAD in 8-bit format passes on second bus $MA_{0-7}$ and is applied to the address input of D-RAM image memory device 100 as a row address and a column address. After inputting the column address, image data ID0, ID1, ID2, etc. (FIG. 3-g) stored in D-RAM image memory device 100 are outputted responsive to latch pulse LP2 as shown in FIG. 3-g.

Three-state buffer 16 in control circuit 22 is set active in accordance with a "1" mode signal P1 when a D-RAM image memory device 100 is used, and 3-state buffers 17 and 18 are set in high impedance state. Then, third bus $MAD_{8-15}$ is changed into a data bus usage state. Image data $ID_{0-7}$ and $ID_{8-15}$ read out from D-RAM image memory device 100 are transmitted respectively through first bus $MD_{0-7}$ and third bus $MAD_{8-15}$ to latches 13 and 15. Latches 13 and 15 respectively latch lower 8 bit image data $ID_{0-7}$ and upper 8-bit image data $ID_{8-15}$ responsive to latch pulse LP1 turning positive. Therefore, image data $ID_{0-15}$ (FIG. 3-h) held in latches 13 and 15 are applied to data processing circuit 20 8 bits from each or a total of 16 bits. Data processing circuit 20 converts image data $ID_{0-15}$ to display data DD for CRT 200.

As described above, third bus $MAD_{8-15}$ acts as the data bus when a D-RAM is used as image memory device 100. For this purpose, address information DAD is provided to D-RAM image memory device 100 every 8 bits as the row address or the column address through second bus $MA_{0-7}$ in a time-shared way during each cycle period of latch pulse LP2. The image data ID0, ID1, etc. is provided to data processing circuit 20 every 16 bits through both first bus $MD_{0-7}$ and third bus $MAD_{8-15}$.

FIG. 4 shows the timing chart for the use of a S-RAM as image memory device 100. S-RAM image memory device 100 is given 16-bit address information for reading out the image data stored therein as described above. The reading operation of image data ID out of S-RAM image memory device 100 is performed for each 8-bits by one unit. Also, logic value "0" is set as mode signal P1 in mode signal generator 19 when using the S-RAM.

Since mode signal P1 is "0", the AND gate 213 output is in the "0" state to prevent passing of latch pulse LP2 (FIG. 4-c) therethrough. Address switch 212 is always held at input terminal A in accordance with the "0" input supplied from AND gate 213 on its select terminal S. Therefore, address switch 212 selects only the lower 8-bit output Q0–Q7, "00"H, "01"H, "02"H, etc. (FIG. 4-f) of the 16-bit output (FIG. 4-e) of address counter 210. The lower 8-bit output Q0–Q7, "00"H, "01"H, "02"H, etc. are outputted from address generator 21 as address information DAD. Address information DAD is supplied to S-RAM image memory device 100 through second bus $MA_{0-7}$. Also, the other 8-bit address information SAD, where the MSB is replaced by latch pulse LP2, is used as the other address information SAD. Therefore, two kinds of address information "00"H and "80"H (FIG. 4-g) are generated corresponding to each address information DAD, since latch pulse LP2, as the MSB of address information SAD, changes between "0" and "1" on every cycle.

In this case the 3-state buffers 16 and 17 in control circuit 22 are set respectively in high impedance state and active state in accordance with the "0" mode signal P1, third bus $MAD_{8-15}$ acts as the address bus for transmitting address information SAD to S-RAM image memory device 100. Therefore, S-RAM image memory device 100 receives address information for each 16-bits in every cycle of latch pulse LP2 through both second and third buses $MA_{0-7}$ and $MAD_{8-15}$. The address information in every "1" period of latch pulse LP2 are each a combination of address information DAD, "00"H, "01"H, "02"H, etc. (FIG. 4-f) and the one address information SAD, "00"H. While the address information in every "0" period of latch pulse LP2 are each a combination of address information DAD, "00"H, "01"H, "02"H, etc. (FIG. 4-f) and the other address information SAD, "80"H. Thus address information, "0000"H, "0001"H, "0002"H, etc. are supplied to S-RAM imaqe memory device 100 in the "0" period of latch pulse LP2, while address information, "8000"H, "8001"H, "8002"H, etc. are supplied to S-RAM image memory device 100 in the "1" period of latch pulse LP2. S-RAM image memory device 100 then outputs lower and upper 8-bit image data, $ID_{00}$ and $ID_{01}$, $ID_{10}$ and $ID_{11}$, $ID_{20}$ and $ID_{21}$, etc. respectively in every cycle of latch pulse LP2, as shown in FIG. 4-h. Eight-bit image data ID read out from S-RAM image memory device 100 are latched in latches 13 and 14 through first bus $MD_{0-7}$ by being time-shared.

Latch 14 latches image data, $ID_{00}$, $ID_{10}$, $ID_{20}$, etc. which was supplied to first bus $MD_{0-7}$ in the "0" period of latch pulse LP2 when latch pulse LP2 turns to "1". Image data, $ID_{00}$, $ID_{10}$, $ID_{20}$, etc. thus latched in latch 14 is applied to latch 15 through 3-state buffer 18 which is set in active state in accordance with the "0" mode signal LP2 on its inverted control terminal. Latch 15 latches image data, $ID_{00}$, $ID_{10}$, $ID_{20}$, etc. when latch pulse LP1 turns to "1". Latch 13, on the other hand, latches image data, $ID_{01}$, $ID_{11}$, $ID_{21}$, etc. which was supplied to first bus $MD_{0-7}$ in the "0" period of latch pulse LP1 when latch pulse LP1 turns to "1". Therefore, image data, $ID_{01}$, $ID_{11}$, $ID_{21}$, etc. are latched in latch 13 when image data, $ID_{00}$, $ID_{10}$, $ID_{20}$, etc. are latched in latch 15. In other words, image data ID of 16 bits are latched in two latches 15 and 13 divided in two image data ID of 8 bits. Then two 8 bit image data ID01 and ID00 latched in respective latches 13 and 15 are supplied simultaneously to data processing circuit 20 and processed therein as complete image data ID0. Continuously 8-bit image data, ID11 and ID10, ID21 and ID20, etc. (FIG. 4-i) are applied to data processing circuit 20 and processed as respective 16-bit image data ID1, ID2, etc. Image data, ID0, ID1, ID2, etc. applied to data processing circuit 20 are converted to display data DD for CRT 200.

This is the same as supplying image data to data processing circuit 20 when using a D-RAM. Therefore, the same data processing circuit can be used whether a D-RAM or an S-RAM is used, and no converting unit of image data is required.

As described above, when using an S-RAM as an image memory device, third bus $MAD_{8-15}$ is used as an address bus. For this purpose, address information is given twice during one cycle of latch pulse LP2 through second bus MA0-7 and third bus MAD8-15. Also, image data are latched in latches 13 and 14 on an 8-bit basis through first bus MD0-7. Further, the image data latched in latch 14 are latched in latch 15 at the same time as in latch 13 and the image data of the same 16-bit structure as used in a D-RAM is provided to data processing circuit 20.

As described above, data transmission buses in this embodiment include third bus MAD which selectively acts as a data bus or an address bus controlled by mode signal P1 from mode signal generator 19. Thus, a general purpose image memory control device can be used in which either a D-RAM or an S-RAM can be used as image memory device 100 by merely setting mode signal P1 to either "1" or "0". Therefore, the image memory control device according to the present invention has the advantage that either a D-RAM or an S-RAM can be used as an image memory device.

Also, in this embodiment, the data structure of the image data latched in latches 13, 14 and 15 is the same whether using a D-RAM or an S-RAM. In this respect, the present invention has the advantage that it is possible to make the data processing circuit the same regardless of the type of memory device.

Further, when the image memory control device according to the present invention is fabricated in an integrated circuit, it has the advantage that its connecting pins are reduced when compared to the conventional image memory control device. This is because pins for third bus MAD are used as data transmission bus pins or address transmission buspins.

In the above embodiment, an S-RAM with half the capacity of a D-RAM is used as the image memory device 100. However, an S-RAM with the same capacity as a D-RAM can be used by providing an additional address bus MA16. The address bus MA16 in this case, however, is left unused when a D-RAM is used as image memory device 100.

Further, in the above embodiment, either the S-RAM with the capacity of 4 screens or the D-RAM with the capacity of 8 screens is used. However, if either an S-RAM with the capacity of 1 screen or a D-RAM with the capacity of 2 screens is used, the address information for image memory device 100 will consist of 14 bits. In the case of a D-RAM, 8-bits of the 14 bits are assigned for row addresses, while 6 bits are assigned for column addresses.

Figure 5:
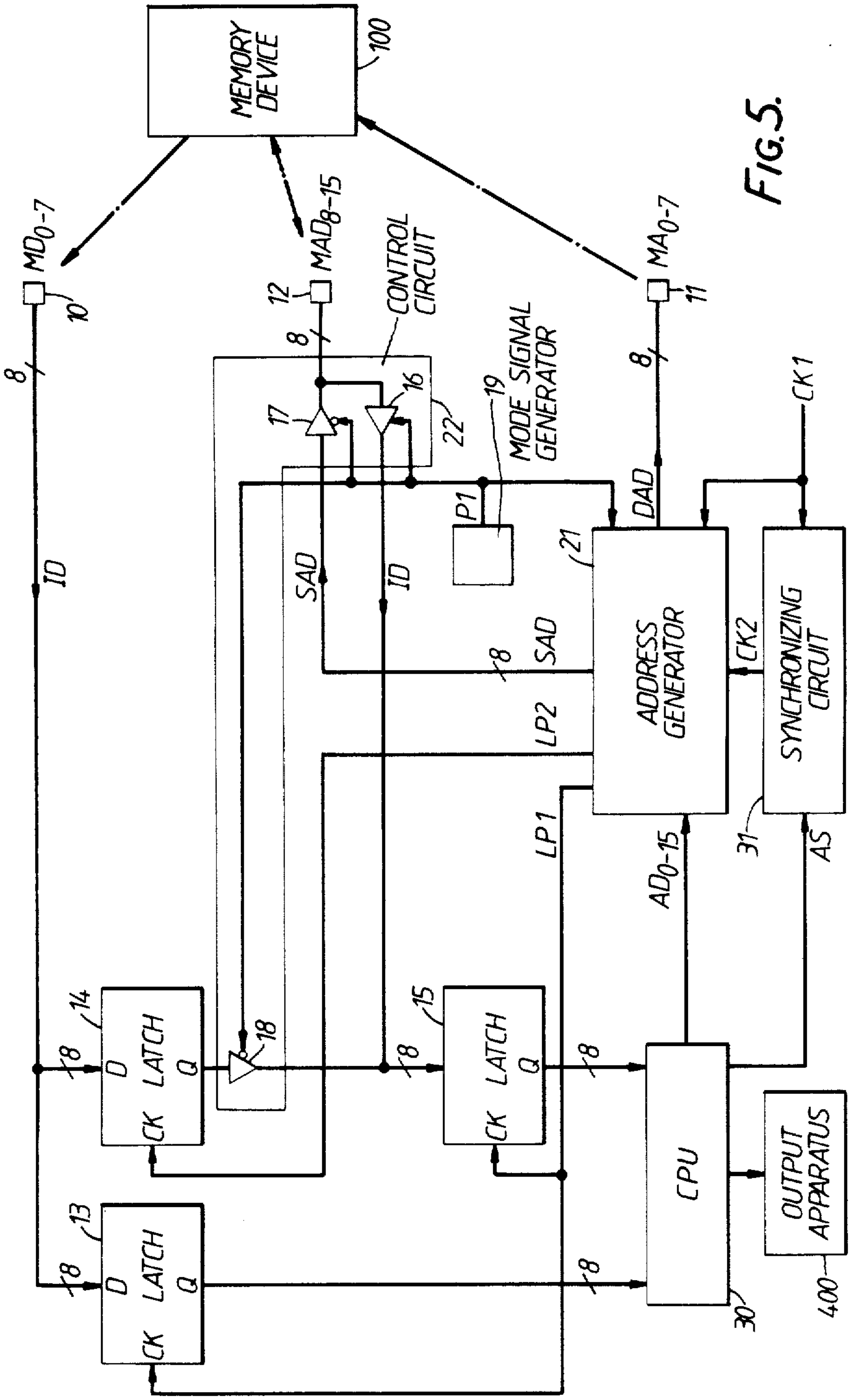
FIG. 5 is a circuit diagram showing a memory control device, which is the second preferred embodiment according to the present invention.
Figure 6:
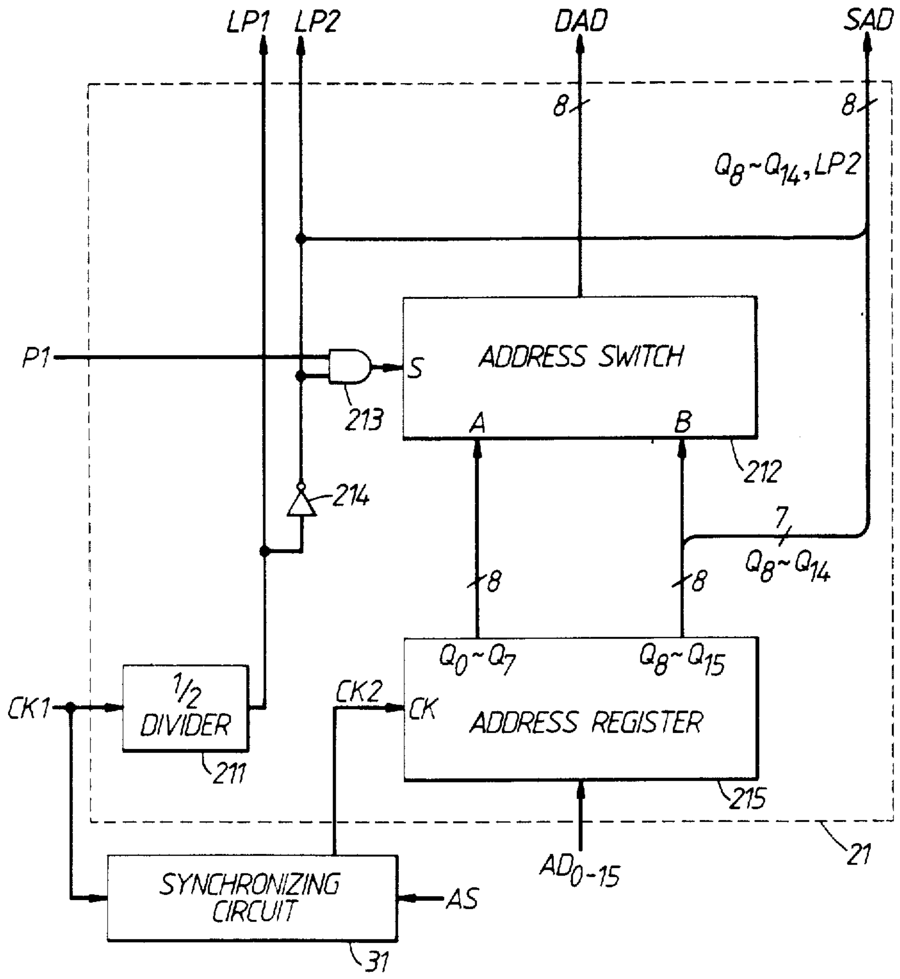
FIG. 6 is a circuit block diagram showing the detail of the address register of the embodiment shown in FIG. 5.

Referring now to FIGS. 5 and 6, a memory control device suitable for a general memory control device accessed by a central processor unit (CPU), which is the second embodiment of the present invention, will be described in detail.

FIG. 5 shows a circuit block diagram of the embodiment together with a memory device 100 and an output apparatus 400. The memory control device shown in FIG. 5 is identical with the first embodiment, i.e., the image memory control device shown in FIG. 1, except for the addition of a CPU 30, a synchronizing circuit 31 and output apparatus 400. CPU 30 and output apparatus 400 replace data processing circuit 20 and CRT 200 of FIG. 1. While synchronizing circuit 81 is added for synchronizing CPU 30 and address generator 21, since CPU 30 generally operates asynchronously with master clock CK1 which is described in reference to the first embodiment shown in FIGS. 1 and 2. Synchronizing circuit 31 supplies address generator 21 with a latch clock CK2 in synchronism with master clock CK1, after an address strobe signal AS is applied from CPU 30. Address strobe signal AS is generated to indicate that a 16-bit address information $AD_{0-15}$ for accessing memory device 100 is supplied from CPU 30 to address generator 21. That is, synchronizing circuit 31 outputs master clock pulse CK1 as latch clock CK2 just after the address strobe signal AS is generated from CPU 30. Address generator 21 converts address information $AD_{0-15}$ supplied from CpU 30 to address data DAD and/or SAD. The other blocks of FIG. 5 operate in the same manner as those of FIG. 1 and the explanation for those will be omitted.

Referring now to FIG. 6, address generator 21 of the embodiment shown in FIG. 5 will be described in detail. FIG. 6 shows address register 215 with synchronizing circuit 31. Address generator 21 of FIG. 5 is identical with the one shown in FIG. 2, except address register 215 replaces address counter 210 of FIG. 2. Address register 215 (FIG. 6) converts address information $AD_{0-15}$ supplied from CPU 30 to address data DAD and/or SAD under the control of latch clock CK2 as described previously. The other blocks of FIG. 6 operate in the same manner as those of FIG. 2 and the explanation for those will be omitted.

Therefore, the memory control device shown in FIGS. 5 and 6 is used for reading into CPUs from any memory device which is a D-RAM or an S-RAM, without changing the circuit arrangement.

According to the present invention, the bus to a memory device includes a data bus, an address bus, and an address/data bus changeable into a data bus or an address bus by setting a mode signal. It is possible to use a memory device with a different interface of address information as a memory device by merely setting a mode signal thereby obtaining a device which can generally be used. The advantages of the first embodiment are also obtained in the second embodiment.

What is claimed is:

1. A memory contorl device for use with a memory having stored data comprising:
   - a memory device;
   - an address generator for generating address information for reading out data from said memory device;
   - a data processing circuit for processing the data read out of said memory device;
   - a first bus for transmitting x bits of stored data from said memory device to said data processing circuit;
   - a second bus for transmitting m bits for address information from said address generator to said memory device;
   - a mode signal generator for generating a mode signal indicating whether said memory is of a first type or a second type;
   - a third data bus; and
   - a control circuit connected between said mode signal generator and said third data bus for controlling the selective data transmission of said third data bus in rseponse to said mode signal, wherein said control circuit causing said third data bus to transmit y bits of stored data from said memory device to said data processing circuit when said memory is of said first type and said control cirucit causing said third data bus to transmit n bits of address information from said address generator to said memory device when said memory is of said second type.

2. The memory control device of claim 1 further having image display means responsive to said data process circuit for converting the data to a display.

3. An image memory control device comprising:

an image memory device for storing image data at addresses corresponding to image display areas of an image display device;

an address generator for generating address information for reading out corresponding image data from said image memory device;

a data processing circuit for converting the image data to display data for displaying on said image display device;

a first bus for transmitting x bits of image data read from said image memory device to said data processing circuit;

a second bus for transmitting m bits of address information from said address generator to said image memory device;

a mode signal generator for generating a mode signal indicating whether said image memory device is of a first type or a second type;

a third data data bus; and a control circuit connected between said mode signal generator and said third data bus for controlling the selected data transmission of said third bus in response to said mode signal, wherein said control circuit causing said third data bus to transmit y bits of stored data from said image memory device to said data processing circuit at times when said memory is of said first type and said control circuit causing said third data bus to transmit n bits of address information from said address generator to said image memory device at times when said image memory device is of said second type.

4. The image memory control device of claim 3 wherein the image memory device can be either a D-RAM or an S RAM.

* * * * *